UNITED STATES PATENT OFFICE.

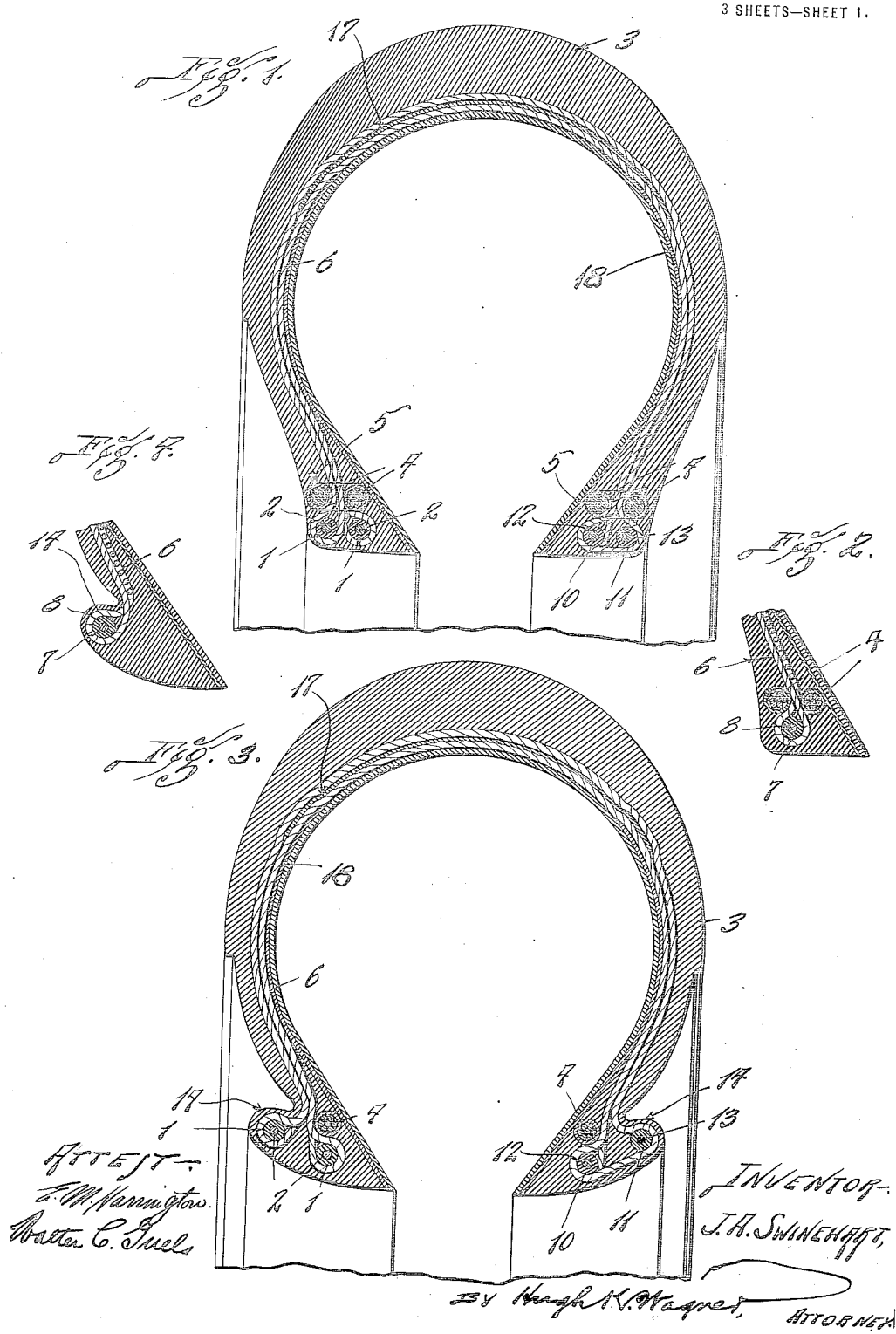

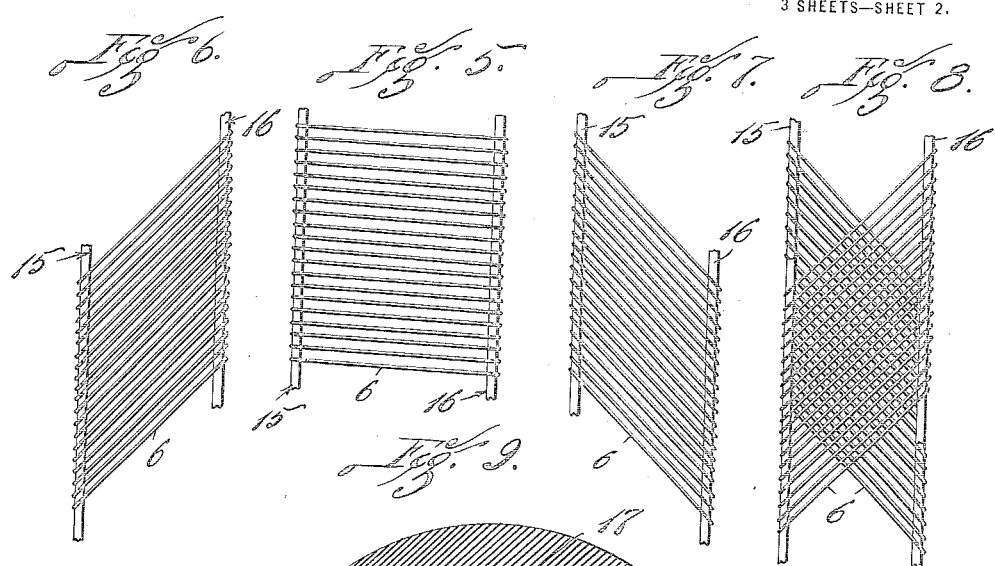
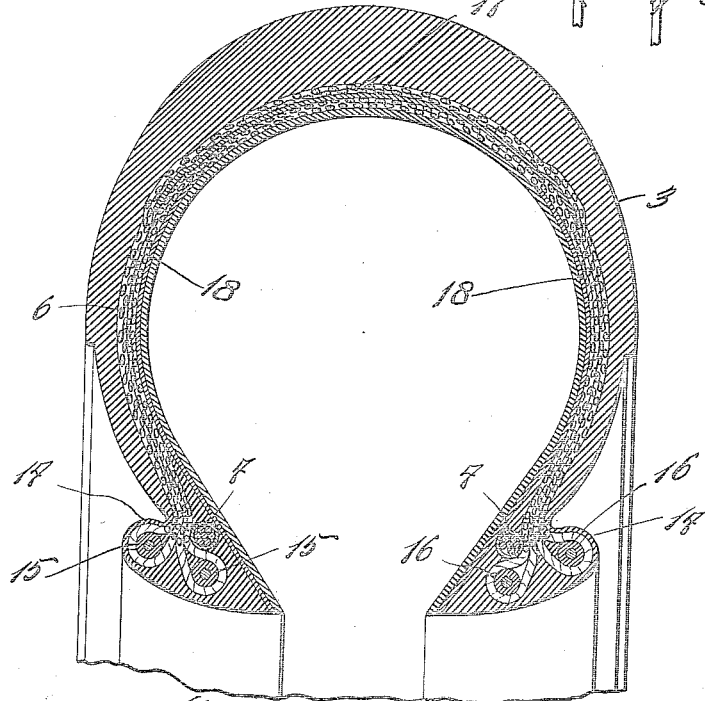
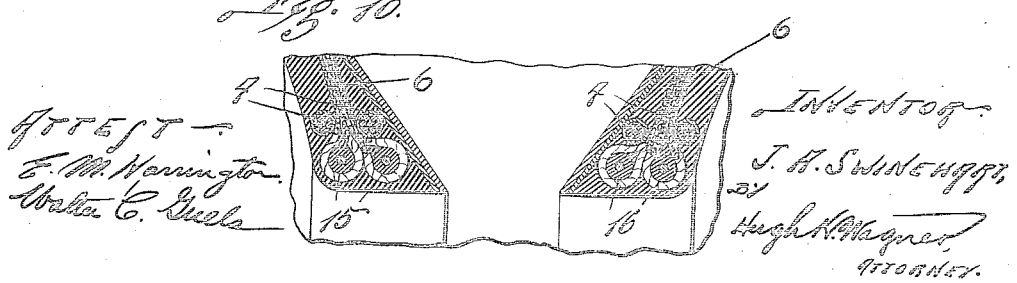

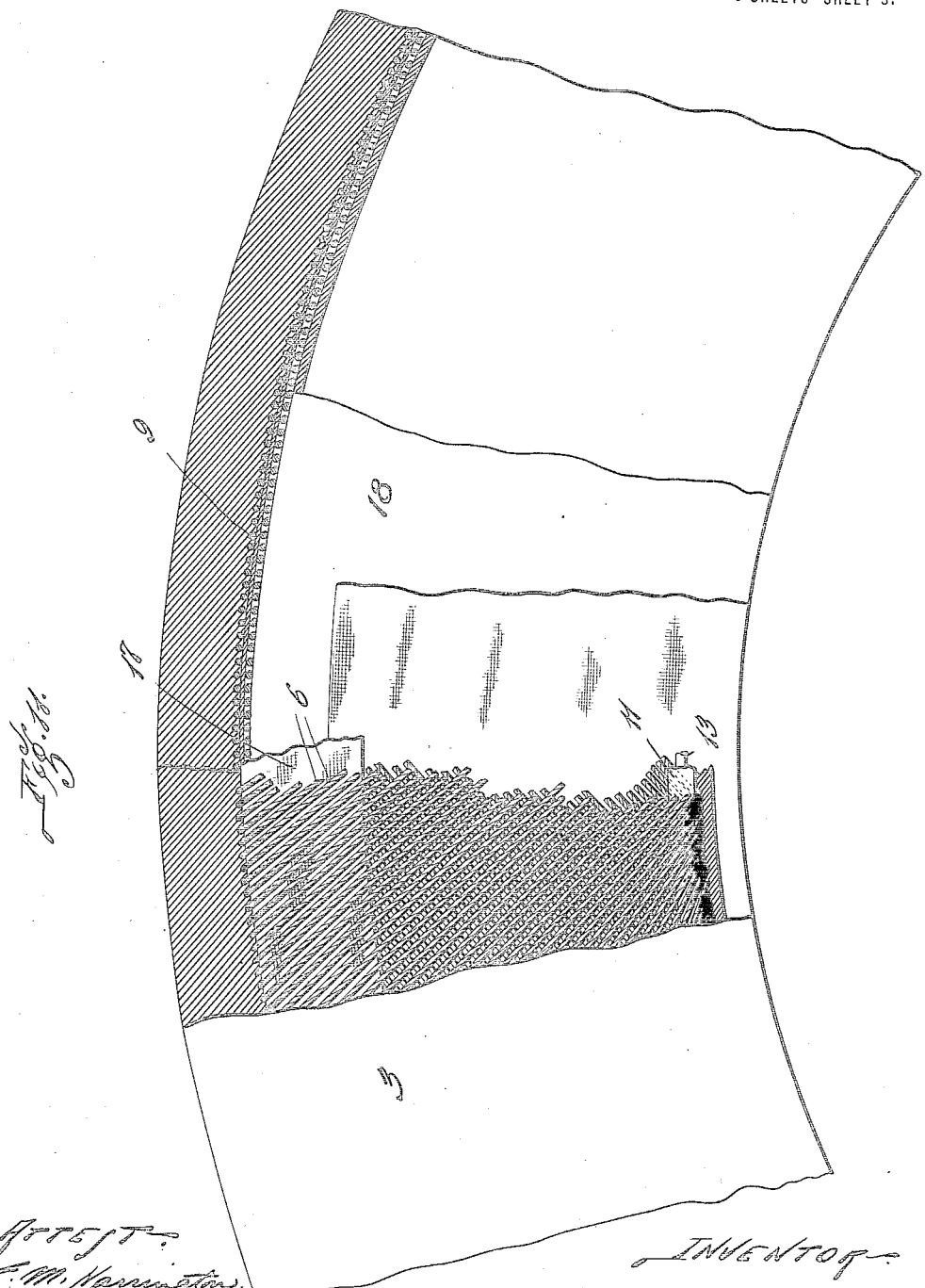

JAMES A. SWINEHART, OF AKRON, OHIO.

VEHICLE-TIRE.

1,309,308.         Specification of Letters Patent.    Patented July 8, 1919.

Application filed February 23, 1915. Serial No. 9,846.

*To all whom it may concern:*

Be it known that I, JAMES A. SWINEHART, a citizen of the United States, residing at Akron, in the county of Summit and State of Ohio, have invented certain new and useful Improvements in Vehicle-Tires, of which the following is a specification.

This invention relates to tires and a process of making same and relates more particularly to improvements in cord tires and their process of manufacture such as described and claimed in my application for patent, Serial Number 877,508, filed in the United States Patent Office December 16, 1914.

An object of the present invention is to provide a tire having a simple, economical, and efficient anchoring means for the cord-like basis embedded in the body of the tire, and, also, to provide a simple, economical, and efficient improved method for forming the net-like cord basis for a tire of this invention.

This invention, furthermore, consists in the arrangement and combination of parts and in the process herein set forth and pointed out in the claims.

In the accompanying drawings forming part of this specification wherein like numbers of reference denote like parts wherever they occur, Figure 1 is a cross-sectional view of a straight-side tire embodying the present invention provided with a pair of anchors adjacent each base, and showing a means for binding said anchors together;

Fig. 2 is a fragmentary cross-sectional view showing a base of a straight-side tire having one flexible support for the net-like structure forming the cord basis of the tire in association with a pair of anchors;

Fig. 3 is a cross-sectional view of a clencher-rim tire embodying the present invention provided with a single anchor adjacent each base, and showing one of each pair of the flexible supports for the net-like structure forming the cord basis of the tire disposed under the shoulder of an adjacent base;

Fig. 4 is a fragmentary cross-sectional view showing a base of a clencher-rim tire having one flexible support for the net-like structure forming the cord-basis of the tire disposed under the shoulder of the base to anchor said structure without the use of the annular anchor shown in Fig. 2;

Fig. 5 is a plan view showing the cord-like member for use in the cord-basis of a tire in the first stage of the process wherein said member is wound about a pair of spaced side-supports;

Fig. 6 is a plan view showing said side-supports moved laterally so that the windings of said cord-like member are disposed diagonally at an angle to said side-supports;

Fig. 7 is a plan view showing a cord-like member wound as in Fig. 5 with the side-supports moved laterally so that the windings are disposed at an angle with said side-supports to cross the lines of the position of the windings shown in Fig. 6 at substantially a right-angle;

Fig. 8 is a plan view showing the windings and side-supports of Fig. 6 superimposed upon the windings and side-supports shown in Fig. 7 to form a net-like structure for the cord-basis of a tire of the present invention;

Fig. 9 is a cross-sectional view of a clencher-rim time formed upon the net-like cord-basis of Fig. 8 with one side-support of said basis at each base of the tire disposed under the shoulder of the adjacent tire-base, and showing the tire provided with an anchor adjacent the inner circumference of each tire-base;

Fig. 10 is a fragmentary cross-sectional view showing the two bases of a straight-side rim tire with the net-like cord-basis of Fig. 8 therein anchored by means of a pair of anchors adjacent each tire-base;

Fig. 11 is a fragmentary view partly in longitudinal section of Fig. 1 disclosing various layers of the structure of a tire embodying the present invention, and showing, more particularly, the tread reinforcing strip of fabric or the like disposed between layers of the cord-basis of the tire, and showing, also, the side reinforcing strip of fabric or the like.

Referring to my application for patent, Serial Number 877,508, filed in the United States Patent Office on December 16, 1914, Figs. 1, 2, 3, and 4 of the drawings accompanying the present application illustrate a tire embodying the present invention provided with a cord-like basis 6 formed and embodied in the tire structure in the manner described in said prior application, Serial Number 877,508, the reference numbers 1, 2, 6, 7, 8, 10, 11, 12, and 13 denoting, wherever found in the drawings accompanying the present application, like parts to those referred to by said reference numbers in the drawings and specification of said prior application, 1 being the pair of flexible tubes upon which the cord-like member 6 is wound, 2 being the wires passed through said tubes 1, 7 being the tube over which the wound cord 6 is folded upon itself in the preferred form described in said prior application to form the net-like structure of the cord-basis for the tire, 8 is the wire passed through tube 7, 10 and 11 are the pair of tubes over which cord-basis 6 is folded upon itself in the alternate form described in said prior application to form said net-like structure, and 12 and 13 are the wires passed through tubes 10 and 11, respectively.

Referring now to Fig. 1 of the accompanying drawings, the cord-basis 6 having been folded into a net-like structure, according to the modified form described in said prior application, preparatory to constructing a tire 3, a pair of circularly shaped anchors 4 may be placed in the tire mold, one anchor being on each side of said net-like structure adjacent tubes 1 and 2 and adjacent a corresponding tire-base, and another pair of similar circular shaped anchors 4 may be placed in the mold, one anchor being on each side of said net-like structure adjacent tubes 10 and 11 and adjacent the other corresponding tire-base, and each pair of anchors 4 may be bound together in any suitable manner, such, for instance, as by means of a plurality of wire loops or the like 5 as depicted in said Fig. 1, said binding loops or the like being placed at intervals of any suitable distance along the circumferential length of said anchors, said binding loops or the like passing through the mesh of said net-like structure held between each pair of anchors. Said anchors may be of any suitable construction or material, such, for instance, as an ordinary wire cable, wire, wood, fiber, metal or the like, and may have any suitable shape in cross-section, but are preferably circular in cross-section, and may be of any suitable thickness, and are preferably each of endless circular construction describing a circle of a circumference adapted to the circumference of the tire associated therewith.

In the case of a tire constructed with cord-basis 6 folded to form the net-like structure according to the preferred form described in my said prior application for patent wherein tube 7 and its wire 8 is disposed in one base of said tire as depicted in the cross-sectional view, Fig. 2, of the accompanying drawings, one pair of anchors 4 may be disposed in said base with reference to said tube 7 and said cord-basis 6, as depicted in said Fig. 2, the relative position of the other pair of anchors 4 in the other base with the pair of tubes 1 being similar to that shown in the left-hand base of the tire illustrated in Fig. 1 of the accompanying drawings.

In the case of a clencher-rim tire, Fig. 3, having its cord-basis 6 folded into a net-like structure according to said modified form, one of the pair of tubes 1 in one tire-base, Fig. 3, may be disposed under the adjacent shoulder 14 of said tire-base and an anchor 4 may be placed substantially opposite said tube 1 on the side of said net-like structure adjacent the inner circumference of the tire, and tube 11 of the pair of tubes 10, 11 in the other tire-base, Fig. 3, may be disposed under its adjacent shoulder 14 of said tire-base and another anchor 4 may be placed substantially opposite said tube 11 on the side of said net-like structure adjacent the inner circumference of the tire. By means of this construction in a clencher-rim tire, the said shoulders 14 of said tire-bases coöperate with said anchors 4 to hold the net-like structure forming the cord-basis of the tire firmly in place.

Moreover, in the case of a clencher rim tire constructed with cord-basis 6 folded over upon itself, according to said preferred form disclosed in said prior application wherein tube 7 and its wire 8 is disposed in one base of the tire, Fig. 4, of the accompanying drawings, said tube may, in manufacturing said tire, be pushed outwardly under shoulder 14 of said tire as shown in said Fig. 4, whereby said tube 8 in said position will coöperate with said shoulder to anchor said net-like structure supported by said tube 8 in said base firmly in position, the disposition of tubes 1 and 2 and of anchor 4 in the other base being similar to that shown in the left hand base of the tire depicted in Fig. 3.

Figs. 5, 6, 7, and 8 of the accompanying drawings disclose a novel method of winding a cord-like member 6 upon a pair of supports 15 and 16 substantially at a right-angle with said supports, as shown in Fig. 5, and having formed two separate sets of such windings for each tire, and having moved the supports 15 and 16 of one set laterally to the position shown in Fig. 6, and having moved the supports 15 and 16 of a companion set to the position wherein cord-like member 6 may traverse the space between each pair of supports 15 and 16 diagonally to the length of said supports, as shown, for instance, in Fig. 7, one of said sets is superimposed upon the other, as shown in Fig. 8, to form the net-like structure of cord-basis 6 for the tire to be manufactured upon same, the space between supports 15 and 16 of each set being adapted to the diameter of said tire. Supports 15 and 16 may be tubes with wire therethrough similar to the tubes 1, 7, 10, and 11, and their respective wires 2, 8, 12, and 13 more particularly described in said prior application, or they may be of any other suitable construction and of any suitable material. The process of forming said supports 15 and 16 into circular shape adapted to the circumference of the tire, and the manner of fastening the ends together to hold said circular shape is similar to that described with reference to forming tubes 1, 7, 10, and 11 into circular shape, and is as described in my said prior application.

In a clencher-rim tire constructed with the net-like structure of cord-basis 6 just described and depicted in Figs. 5, 6, 7, and 8 of the accompanying drawings, one of each of said supports 15 may be disposed under an adjacent shoulder 14 of one tire-base and an anchor 4 may be disposed substantially opposite said support 15 and on the side of said net-like structure adjacent the inner circumference of the tire, and one of each of said supports 16 may be disposed under an adjacent shoulder 14 of the other tire-base, and another anchor 4 may be disposed substantially opposite said support 16 and on the side of said net-like structure adjacent the inner circumference of the tire, the arrangement of said parts being that shown in Fig. 9 of the accompanying drawings. In this manner a support 15 under a shoulder 14 and anchor 4 coöperate in one base, and a support 16 under a shoulder 14 and anchor 4 coöperate in the other base of the tire to anchor said net-like structure forming said cord-basis of the tire firmly in place.

In the case of a straight-side tire constructed with a net-like structure of cord-basis 6 formed in the manner herein described and illustrated in said Figs. 5 to 8, inclusive, supports 15 and 16 may be disposed in the tire-base as shown in Fig. 10 and a pair of anchors 4, one on each side of said net-like structure, may be disposed in each of said basis, as shown in said Fig. 10, which disposition of supports for said net-like structure is substantially similar in effect and general appearance to that illustrated in Fig. 1 of the accompanying drawings.

In the case of an arrangement such as that shown in said Fig. 10, each pair of anchors 4 may be bound together at intervals of any desired distance along the length of their circumference in any suitable manner, such, for instance, as by means of wire loops 5 or the like, Fig. 1, in the manner shown in said Fig. 1, and described above.

Instead of a plurality of separate binders 5, an elongated binding member, not shown, may be spirally wound from one anchor 4 to an adjacent anchor 4 along the circumferential lengths of said anchors to bind same together.

If desired, instead of using two sets of wound pairs of supports as shown in Fig. 8, a plurality of superimposed sets may be used to form the cord-basis for a tire.

It is, of course, also, understood that in forming the net-like structure of cord-basis 6 shown in Fig. 8 of this specification, a strip of rubber 9, Fig. 11, may be placed between a set, Fig. 6, and a set, Fig. 7, of the cord-wound supports 15 and 16 before said sets are superimposed one upon the other, said strip of rubber 9, also described and referred to in my said prior application, serving to fill the interstices between the mesh-like openings of said net-like structure. Moreover, before superimposing said sets, Figs. 6 and 7, one upon the other or before otherwise forming said net-like structure, a layer of fabric or the like 17 may be placed between layers of the cord-basis about to be formed into said net-like structure, said layer of fabric or the like being adapted to reinforce the tire structure adjacent the tread of said tire and being of a length adapted to the circumference of the tire and of a width sufficient for the purpose of affording said reinforcement for said tread. The disposition of said reinforcement in a tire of this invention is best seen in Fig. 11 of the accompanying drawings.

Besides reinforcing the tread of the tire, strip 17 serves to bind the cords of cord-basis 6 together, preventing them from separating or pulling further apart in case, for instance, where an automobile equipped with tires embodying this invention is started suddenly or is heavily laden or otherwise great strain along the line of the circumference of the tires is placed upon them, and, also, said strip 17 provides a protection against "blow-outs" between the mesh-like spaces of cord-basis 6.

To provide additional protection against "blow-outs" and generally to further reinforce the structure of a tire embodying the present invention, strips 18 may be provided, said strips being of any suitable material, such, for instance, as fabric or the like. Said strips 18 are preferably disposed in the tire structure adjacent the inner side of cord-basis 6 and may each extend from a base of the tire to a point under strip 17 so that an end portion of said strip 17 is in overlapped relation, though not necessarily contiguous, to an end portion of each strip 18, as shown in Figs. 1, 3, 9, and 11 of the accompanying drawings. The position of said overlapped relation between end portions of said strips 17 and 18 is preferably adjacent the portions of the tire at which the tire tends to form an angle when in use and at which the tire is relatively most active and where the greatest strain is produced when the tire is in motion under weight.

This arrangement of parts in relation to strips 17 and 18 provides a tire with strong reinforcement at portions where the greatest strain is produced upon a tire in use, and provides especially strong reinforcement at portions of the tire where "blow-outs" are most likely to occur.

Many changes in the details of construction and arrangement of parts may be made without departing from the nature and spirit of this invention.

I claim:

1. A tire for automobile wheels and the like consisting of a cord-basis embedded in the tire structure, annular means borne by the lateral ends of said basis in each tire-base adapted to support said basis, and a pair of annular members in each base adapted to anchor said basis in place in the tire.

2. A tire for automobile wheels and the like consisting of a cord-basis embedded in the tire structure, annular means borne by the lateral ends of said basis in each tire-base adapted to support said basis, and a pair of annular members in each base adapted to anchor said basis in place in the tire, said annular anchor members being disposed in each base with said cord-basis between each pair of said anchor members.

3. A tire for automobile wheels and the like consisting of a cord-basis embedded in the tire structure, annular means borne by the lateral ends of said basis in each tire-base adapted to support said basis, and a pair of annular members in each base adapted to anchor said basis in place in the tire, said annular anchor members being disposed in each base above said supporting means and with said cord-basis between each pair of said anchor members.

4. A tire for automobile wheels and the like consisting of a cord-basis embedded in the tire structure, annular means borne by the lateral ends of said basis in each tire-base adapted to support said basis, a pair of annular members in a base of said tire adapted to anchor said basis in place, and means borne by said pair of anchor members adapted to bind same together.

5. A tire for automobile wheels and the like consisting of a cord-basis embedded in the tire structure, annular means borne by the lateral ends of said basis in each tire-base, a pair of annular members in a base of said tire adapted to anchor said basis in place, and means borne by said pair of anchor members adapted to bind said members together throughout their circumferential length.

6. A tire for automobile wheels and the like consisting of a cord-basis embedded in the tire structure, annular means borne by the lateral ends of said basis in each tire-base, a pair of annular members in each of said bases adapted to anchor said basis in place, and means borne by each pair of said anchor members transverse their circumferential length to bind said pair of members together.

7. A tire for automobile wheels and the like consisting of a cord-basis embedded in the tire structure, an annular supporting means borne by one lateral end of said cord-basis in one tire-base, a pair of annular supporting members borne by the other lateral end of said cord-base in the other tire-base, all of said supporting members being adapted to anchor said cord-basis in place in the tire, and another annular member adjacent said pair of supporting members adapted as an auxiliary anchor to coöperate with said pair of supporting members to anchor said basis in place in the tire.

8. A tire for automobile wheels and the like consisting of a cord-basis embedded in the tire structure, a pair of annular supporting members borne by each of the lateral ends of said basis in each tire base, all of said supporting members being adapted to anchor said basis in place in the tire, and another annular member adjacent each of said pair of supporting members adapted to coöperate as an auxiliary anchor with each of said pair of supporting members to anchor said basis in place in the tire.

9. In a tire for automobile wheels and the like, the combination with a plurality of layers of rubber, fabric, and the like, of a cord-basis embedded in the tire structure, a reinforcing strip borne by said cord-basis adapted to reinforce the tread of the tire, and lateral reinforcing members embedded in the tire structure adjacent said cord-basis, said reinforcing member having an end portion extending toward the tread of the tire beyond an end of said strip, said member being adapted laterally to reinforce the tire and being adapted, also, to coöperate with portions of said strip to reinforce said tire structure.

10. In a tire for automobile wheels and the like, the combination with a plurality of layers of rubber, fabric, and the like, of a cord-basis embedded in the tire structure, elastic means borne by said cord-basis adapted to fill the interstices between cords of said cord-basis and to reinforce the tread of the tire, a strip adapted to reinforce the tread of the tire, and reinforcing strips located on each side of the tire and extending from a point adjacent to the wheel rim to a point adjacent to the tire-tread and partially overlapping the respective ends of the said strip, the said reinforcing strips being embedded in the tire structure adjacent to the said cord-basis, said reinforcing strips having an end portion respectively extending toward the tread of the tire and beyond an end of the said strip, and said strips being adapted to reinforce the tire on its sides and being adapted also to coöperate with parts of the said strip to reinforce the said tire structure.

11. In a tire for automobile wheels and the like, the combination with a plurality of layers of rubber, fabric, and the like, of a cord-basis embedded in the tire structure, elastic means borne by said cord-basis adapted to fill the interstices between the cords of said cord-basis, means borne by said cord-basis adapted to reinforce the tread of the tire, annular means borne by the lateral ends of said basis in each tire-base adapted to support said basis, and means adjacent said supporting means adapted to anchor said basis in place in the tire.

12. In a tire for automobile wheels and the like, the combination with a plurality of layers of rubber, fabric, and the like, of a cord-basis embedded in the tire structure, elastic means borne by said cord-basis adapted to fill the interstices between the cords of said cord-basis, means borne by said cord-basis adapted to reinforce the tread of the tire, annular means borne by the lateral ends of said basis in each tire-base adapted to support said basis, and annular anchoring means embedded in said tire structure adjacent said supporting means adapted to anchor said basis in place in the tire.

13. In a tire for automobile wheels and the like, the combination with a plurality of layers of rubber, fabric, and the like, of a cord-basis embedded in the tire structure, said cord-basis consisting of layers having the trend of the cord-like member of one layer lying in a direction at an angle to the trend of the cord-like member in another layer, elastic means borne between layers of said cord-basis adapted to fill interstices between the cords of said basis, a reinforcing member borne between layers of said cord-basis adapted to reinforce the tread of the tires, annular means borne by the lateral ends of said basis in each tire-base adapted to support said basis, and annular means embedded in said tire structure adjacent said supporting means adapted to anchor said basis in place in the tire.

14. In a tire for automobile wheels and the like, the combination with a plurality of layers of rubber, fabric, and the like, of a cord-basis embedded in the tire structure, said cord-basis consisting of layers having the trend of the cord of one layer crossing the trend of the cord of another layer at an angle thereto, a reinforcing strip borne between layers of said cord-basis adapted to reinforce the tread of the tire, lateral reinforcing members embedded in the tire structure adjacent said cord-basis, said reinforcing member having an end portion extending toward the tread of the tire beyond an end of said strip, said members being adapted laterally to reinforce said tire and being adapted, also, to coöperate with portions of said strip to reinforce said tire structure, annular means borne by the lateral ends of said cord-basis in each tire-base adapted to support said basis, and annular means embedded in said tire structure adjacent said supporting means adapted to anchor said cord-basis in place in the tire.

15. In a tire, such as described, a tire casing, a cord-basis therefor, embedded therein and comprising two spaced thicknesses, and a reinforcing strip disposed between the spaced sections, filling the same and reinforcing the tread of said tire.

16. In a tire such as described, the combination with a casing, of a cord-basis embedded therein and comprising two spaced thicknesses which are offset upon opposite sides of the tread of said tire, and a reinforcing strip disposed between the spaced thicknesses of the cord-basis and having its edges offset and disposed between the offset portions of the said cord-basis.

In testimony whereof I hereunto affix my signature in the presence of two witnesses.

JAMES A. SWINEHART.

Witnesses:
 NANCY C. THOMAS,
 WALTER C. GUELS.